Dec. 8, 1953 B. McMILLAN 2,662,124

TRANSISTOR AMPLIFIER CIRCUIT

Filed June 1, 1949 3 Sheets-Sheet 1

ORIENTATION:

NOTATION FOR A TRANSISTOR:

THE OPEN-CIRCUIT INTERPRETATION OF THESE Z'S GIVES THE FOLLOWING EQUIVALENT T:

INVENTOR
B. McMILLAN
BY N. S. Ewing
ATTORNEY

Dec. 8, 1953 B. McMILLAN 2,662,124

TRANSISTOR AMPLIFIER CIRCUIT

Filed June 1, 1949 3 Sheets-Sheet 2

INVENTOR
B. McMILLAN
BY
N. S. Ewing
ATTORNEY

INVENTOR
B. McMILLAN
BY N. S. Ewing
ATTORNEY

Patented Dec. 8, 1953

2,662,124

UNITED STATES PATENT OFFICE 2,662,124

TRANSISTOR AMPLIFIER CIRCUIT

Brockway McMillan, Summit, N. J., assignor to Bell Telephone Laboratories, Incorporated, New York, N. Y., a corporation of New York Application June 1, 1949, Serial No. 96,485

3 Claims. (Cl. 179—171)

This invention relates in general to electrical translation devices. More particularly, it relates to the amplification and phase inversion of electrical signal currents.

In accordance with the disclosure of application Serial No. 11,165 filed on February 26, 1948, by J. Bardeen and W. H. Brattain, (since abandoned in favor of application Serial No. 33,466, filed June 17, 1948, which issued on October 3, 1950, as Patent 2,524,035) amplification of electrical signals is obtained by means of a device known as the transistor, which comprises a pair of "formed" point electrodes in "rectifier" contact with the treated surface of a block of semiconducting material such as, for example, germanium, and an additional electrode in ohmic contact with the body of the block.

In one embodiment of the transistor amplifier as disclosed in Fig. 10 of Patent 2,524,035 supra, signal currents are impressed between the base electrode and ground, i. e., the point of common potential for the external circuits to the three electrodes. It can be shown that under certain conditions the output potential appearing on the collector electrode of this circuit is reversed in phase with respect to the impressed input signal potential, thus providing a phase-inverter circuit. However, because of certain inherent relationships between the internal and external impedances of the aforesaid circuit, the output impedance looking back into the collector circuit is negative under most conditions, a factor which makes the connection with following circuits difficult.

Moreover, in many other types of transistor amplifiers disclosed by Bardeen-Brattain supra and by others, impedance matching to circuits connected to the input and output terminals occasionally presents problems because of the large difference between the internal input and output impedances of the transistor.

Another characteristic of the transistor amplifier, as embodied in the various circuits disclosed by Bardeen-Brattain supra, and by others, is the inherency of positive feedback through resistance of the semi-conducting block which is common to the input and output circuits. This factor tends to produce instability under certain operating conditions.

A principal object of the present invention is to provide improvement in the operating characteristics of various types of transistor amplifiers.

A more specific object of the present invention is to improve the impedance-matching characteristics of certain types of transistor amplifiers.

Another object of the present invention is to reduce positive feedback in transistor amplifiers.

Still another object of the present invention is to provide for negative feedback in transistor-amplifier circuits.

These objects and others, which will be apparent hereinafter, are carried out in a preferred embodiment of the present invention which comprises a two-stage phase-inverting amplifier including a pair of transistors connected in tandem, wherein the emitter of the first stage and the collector of the second stage are connected to ground, i. e., a common point of reference potential in the circuit. The collector of the first stage is connected for signal transmission to the emitter of the second stage. The input signal is impressed on the base electrode of the first stage; and the output signal is taken off of the base electrode of the second stage.

As will be pointed out in detail hereinafter, such a circuit has certain advantages, namely, it provides phase inversion of the input signal potential while presenting a positive impedance looking back into the output; it has only a small amount of intrinsic positive feedback; and it has a lower output impedance than a circuit including a single transistor, with about the same current gain.

The specification describes in detail alternative biasing circuits for the aforesaid two-stage tandem transistor amplifier.

An additional modification is described for substantially eliminating or neutralizing the residual positive feedback in the tandem amplifier by introducing an impedance element which is common to the source and load circuits. If this common impedance element in the tandem circuit is sufficiently large, an amplifier is produced having negative feedback from output to input, a feature which is desirable in some applications.

Furthermore, the specification describes, as an independent operating unit, the second stage of the foregoing two-stage amplifier, including a signal source connected between the emitter electrode and common or ground point, and a load impedance connected between the base electrode and the common or ground point.

Additional objects and features of the invention will be better understood from a study of the detailed specification and claims hereinafter and the attached drawings of which:

Each of the circuits described in the specification and claims hereinafter includes as its active elements an amplifying device which is known in the art as a "transistor," the construction and operation of which is described in detail in Patent 2,524,035.

The body of the transistor comprises a block of germanium, the crystalline structure of which is believed to be altered by the presence of slight quantities of impurities as described in Bardeen-Brattain, supra, to provide different conductivity types, such as, for example, P-type and N-type. When the major portion of the block comprises material of one type, for example N-type, the surface of which has been treated in a manner which is believed to produce a thin "barrier" layer of P-type, the block exhibits remarkable amplifying properties. Formed point contacts respectively denoted the "emitter" and the "collector," make rectifying contact with the treated surface of the germanium block. A third electrode denoted the "base," makes low resistance contact with the body of the block.

In the specification hereinafter, it has been assumed that the body of the transistor disclosed comprises N-type germanium having a treated or barrier layer of P-type. However, it is apparent from a study of Bardeen-Brattain, supra, that transistors comprising a block having a body of P-type material with a barrier layer of N-type material will be equally suitable for substitution in the circuits described hereinafter. For the latter case, the polarity of the biases on the emitter and collector electrodes will be the reverse of those for the transistors described hereinafter.

As a background for the discussion hereinafter, notations and conventions, as applied to transistor circuits, will be discussed briefly.

Figure 1A:
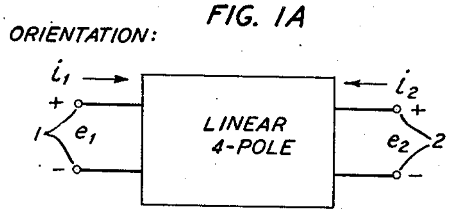
Figs. 1A–1C are diagrams utilized in defining transistor symbolism.

Fig. 1A shows a four-terminal device which has two externally accessible meshes. It is convenient to describe such devices as four poles, even though only two of the three possible external meshes are of interest.

Assuming that currents of the form $i_1\epsilon^{pt}$, $i_2\epsilon^{pt}$ are specified arbitrarily in the two external meshes, where $\epsilon^{pt}$ represents a sinusoidal function of time in terms of $\epsilon$, the natural logarithmic base. The term $p$ is the frequency in radians, i. e. $2\pi f$ (more usually designated "$\omega$"), and $t$ is the time in seconds. Then voltages $e_1\epsilon^{pt}$, $e_2\epsilon^{pt}$ appearing across the external terminal pairs, are related to the currents by the following set of equations:

$$e_1=\underline{Z}_{11}i_1+\underline{Z}_{12}i_2 \quad (1)$$

$$e_2=\underline{Z}_{21}i_1+\underline{Z}_{22}i_2 \quad (2)$$

where the Z's are complex functions of $p$.

Equations 1 and 2 are valid under the assumptions that the device is linear and the currents $i_1$ and $i_2$ are unrestricted.

Equations 1 and 2 can be symbolized in matrix form as follows:

$$\begin{matrix}\underline{Z}_{11} & \underline{Z}_{12}\\ \underline{Z}_{21} & \underline{Z}_{22}\end{matrix} \quad (3)$$

Placing $i_2=0$, and observing from Equations 1 and 2 the dependence of $e_1$ and $e_2$ on $i_1$, it is easy to interpret $Z_{11}$ as the driving point or self-impedance of mesh 1 when mesh 2 is open, and $Z_{21}$ as the transimpedance from mesh 1 to mesh 2 when mesh 2 is open. In a similar manner, when $i_1$ is placed equal to zero, it may be observed that $\underline{Z}_{22}$ is the self-impedance of mesh 2 when mesh 1 is open, and $\underline{Z}_{12}$ the open-circuit transimpedance from mesh 2 to mesh 1.

Figure 1B:
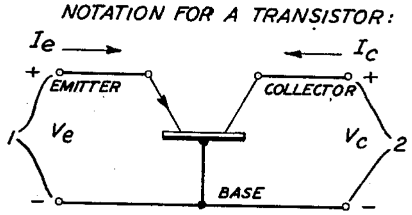

Referring to the conventionalized diagram of the transistor in Fig. 1B, which shows an emitter electrode, a collector electrode and a base electrode in contact with a semiconducting body, as described hereinbefore, the terminals 1 to the emitter and the base, and the terminals 2 to the collector and the base may be considered as corresponding to the respective terminals 1 and 2 of the generalized four-pole of Fig. 1.

Assuming that $V_e$ represents the direct-current emitter potential, $I_e$ the direct-current emitter current, $V_c$ the direct-current collector potential, and $I_c$ the direct-current collector current, it has been found that any two of these may be chosen as independent variables, and the remaining two expressed as functions thereof.

Adopting $I_e$, $I_c$ as independent variables, we have the relations:

$$V_e=V_c(I_e, I_c) \quad (4)$$

$$V_c=V_e(I_e, I_c) \quad (5)$$

Applying small increments $\Delta I_e$, $\Delta I_c$ to the direct-current values, one computes the first order increments in the voltages as follows:

$$\Delta V_e=\frac{\partial V_e}{\partial I_e}\Delta I_e+\frac{\partial V_e}{\partial I_c}\Delta I_c \quad (6)$$

$$\Delta V_c=\frac{\partial V_c}{\partial I_e}\Delta I_e+\frac{\partial V_c}{\partial I_c}\Delta I_c \quad (7)$$

From the above, placing $\Delta I_e=I_e\epsilon^{pt}$, $\Delta I_c=i_c\epsilon^{pt}$, $\Delta V_e=v_e\epsilon^{pt}$, and $\Delta V_c=v_c\epsilon^{pt}$, the equations take the same form as (1) and (2) above, where:

$$\underline{Z}_{11}=\frac{\partial V_e}{\partial I_e} \qquad \underline{Z}_{12}=\frac{\partial V_e}{\partial I_c}$$

$$\underline{Z}_{21}=\frac{\partial V_c}{\partial I_e} \qquad \underline{Z}_{22}=\frac{\partial V_c}{\partial I_c}$$

It is thus apparent that by the choice of current as an independent variable, the open-circuit impedances are arrived at as parameters for describing the linear behavior of the transistor four-pole.

Figure 1C:
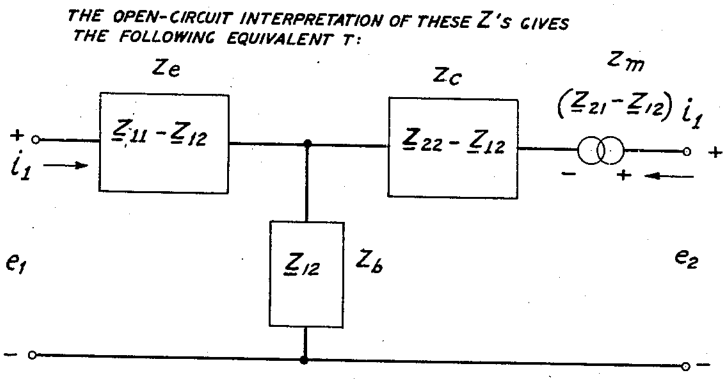

Fig. 1C represents the transistor network of Fig. 1B in the form of an equivalent T network, in which the impedance of the emitter electrode is represented as $z_e$, of the collector electrode as $z_c$, the base electrode as $z_b$, and the net transimpedance as $z_m$. The active element of the transistor is represented as a voltage generator having polarity as shown, in which the voltage is represented as $z_m i$, where $i$ is the instantaneous signal current into the emitter. As indicated in Fig. 1C, the impedances of the equivalent transistor circuit can be defined in terms of the four-pole impedances developed above:

$$z_e = Z_{11} - Z_{12}$$
$$z_c = Z_{22} - Z_{12}$$
$$z_b = Z_{12}$$
$$z_m = Z_{21} - Z_{12}$$

For the purposes of this discussion, the reactive components of the aforesaid impedances will be neglected, and the resistive components thereof will be designated as $r_e$, $r_c$, $r_b$, $r_m$, all of which will be assumed to represent positive values.

For the purpose of the present disclosure and claims, the current amplification factor $\alpha$ of the transistor may be defined approximately as the ratio $r_m/r_c$. The basic transistor terminology thus defined will now be utilized in a brief theoretical discussion of the circuit of the present invention.

Figure 2:
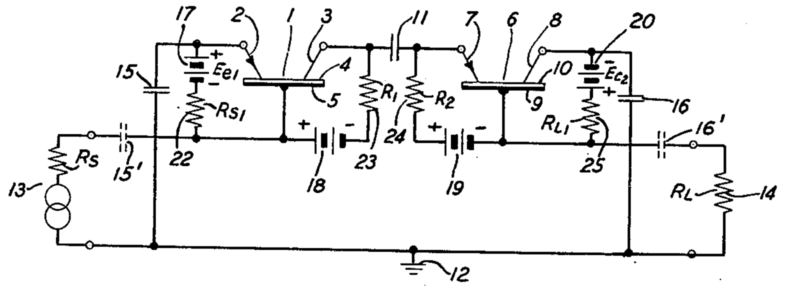
Fig. 2 shows the circuit schematic of one embodiment of the two-stage tandem phase-inverter transistor amplifier of the present invention including biasing circuits.

Fig. 2 shows one form of an amplifying device in accordance with the present invention comprising two transistors connected in tandem relation for signal transmission, a source of signal connected to the input of the tandem pair, a load resistance connected to the output of the tandem pair, and associated apparatus.

Figure 3:
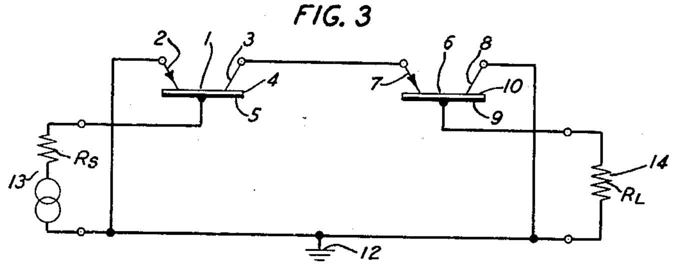
Fig. 3 is a simplified schematic including only the signal circuit of the tandem amplifier of Fig. 2.

For proper understanding of the operation of this device, it is convenient to refer first to Fig. 3 which is a diagrammatic showing of only those parts of the circuit which serve to carry appreciable currents at signal frequencies, whereas the additional connections required to supply proper operating voltages to the transistors have been omitted. Fig. 3 shows transistor 1 which is equipped with point contact emitter and collector electrodes respectively, 2 and 3, in rectifying contact with the semiconducting block 4 which comprises germanium or similar material. The additional ohmic contact or base electrode 5 is attached to the body of the block 4. The transistor electrodes and semiconducting block are prepared in a manner described in detail in the application of Bardeen-Brattain supra. In a similar manner, the transistor 6 is equipped with emitter, collector and base electrodes respectively 7, 8 and 9, in contact with a semiconducting body 10.

In Fig. 3 the emitter 2 of the transistor 1 and the collector 8 of the transistor 6 are both connected to the common or ground lead 12 which represents a convenient reference point from which the potentials of the several electrodes may be measured. The signal source 13, which may comprise any conventional signaling circuit, is connected between the base electrode 5 of the transistor 1 and the ground point 12, and is represented schematically as a generator in series with an impedance which in the figure is indicated simply as a resistance $R_S$. The load circuit 14 is connected between the base electrode 9 of the transistor 6 and the ground point 12, and is represented in the figure simply as a resistance $R_L$. The output of the transistor 1, appearing on the collector electrode 3, is connected directly to the input of the transistor 6 through the emitter electrode 7 of the latter.

Figure 4:
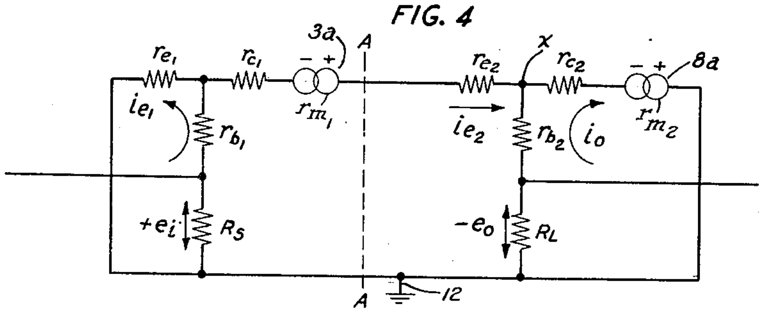
Fig. 4 represents an equivalent circuit of Fig. 3.

Fig. 4 shows an equivalent circuit for Fig. 3, with the transistors 1 and 6 indicated as T networks, each having a current generator in the collector arm. For convenience, the reactive components have been neglected, and the respective internal transistor impedances are indicated as pure resistances, $r_e$, $r_c$, $r_b$ and $r_m$ with appropriate subscripts.

The equivalent circuit in Fig. 4 is shown divided by a dotted line AA. For convenience, consideration will first be given to that part of the circuit to the right of the line AA which is substantially similar to the circuit of Fig. 9, wherein the transistor is shown driven by a generator 13 of internal impedance $R_S$. For the purposes of the present discussion, the resistance in the external collector circuit will be assumed equal to zero.

The generator 8a of Fig. 4 represents the active amplification of the transistor 6, which develops a voltage $r_{m_2} i_{e_2}$ with the polarity as indicated, where $r_{m_2}$ is positive. As indicated in Fig. 4, the current $i_{e_2}$ is that flowing through $r_{e_2}$. If the resistance of the external circuit of collector 8 is zero or negligible, as stated, a positive current $i_{e_2}$ produces a voltage in the generator 8a which tends to bring the potential of the point X negative relative to the ground point. If sufficient current is available from the generator 8a, the potential of the point X may actually become negative despite the current $i_{e_2}$ which is flowing in such a direction as to make it positive. The condition for this reversal of polarity is that $\alpha$, the current amplification of the transistor, be sufficiently large. The exact critical value for $\alpha$ depends upon the values of $R_L$, the load resistance, and $r_{e_2}$, the internal emitter resistance of the transistor 6. In any case, this value should preferably exceed unity, but with typical circuit values, need not be as great as two.

The argument just advanced shows that with $\alpha$ sufficiently large, the impedance measured between the input terminals to the second stage of the circuit, that is, the impedance into which that part of the circuit to the left of the line AA works, is negative, since a positive applied current $i_{e_2}$ produces a negative potential at its point of application. This condition will ordinarily obtain with typical circuit values.

A quite similar argument will show that the circuit to the left of AA also presents a negative impedance to the terminals on the line AA. With these facts in mind let us now assume that in Fig. 4 an instantaneous signal potential $e_i$ is impressed across the resistance $R_S$ which is high relative to the internal resistance of the transistor. This produces a current $i_{e_1}$ in the circuit of the emitter 2 of the transistor which passes to ground through the relatively low emitter resistance $r_{e_1}$ as indicated. Since $i_{e_1}$, as drawn in Fig. 4, is in the negative direction relative to the orientation conventions of Figs. 1A and 1C, a voltage $r_{m_1} i_{e_1}$ with polarity opposite to that indicated on the generator 3a appears across that generator. We have indicated above, however, that this generator is in a mesh having a negative impedance. The current $i_{e_2}$ which flows because of this generator voltage is therefore oriented as shown in Fig. 4. This is a positive current relative to the orientation conventions of Figs. 1A and 1C for the transistor 6. Correspondingly, the voltage $r_{m_2} i_{e_2}$ appears across the generator 8a, of the polarity indicated on the diagram. The current $i_0$ flowing as a result of this voltage is such as to cause the output voltage $e_0$ to be negative, provided $i_0 > i_{e_2}$. This inequality will prevail under the conditions of operation assumed for this discussion. It corresponds to the condition that the current gain $\alpha$ of the transistor 6 sufficiently exceed unity. Therefore, under normal conditions of operation, a positive input voltage produces a negative output voltage. That is, the output potential $e_0$ across the terminals of the load resistance $R_L$ is reversed in phase with respect to the impressed input signal $e_i$ which was applied to the base of transistor 1. This assumes that the resistance $R_L$ is large compared to the internal resistances of the transistor, and that certain minimum conditions for stability, such as will be discussed hereinafter, have been provided in the system.

In preferred arrangement, the transistor constants of the two units of the tandem combination are substantially equal. On the basis of an analysis of the symmetrical tandem circuit in accordance with matrix circuit theory, it can be stated that in the special case mentioned above, the current gain $\alpha$ of the tandem unit is essentially equal to the current gain of a single transistor stage, and the output impedance is approximately equal to half of that for a single unit, thus making it more nearly equal to the input impedance.

In Fig. 2 the operation for signal currents is substantially the same as discussed in the foregoing paragraph with reference to Fig. 3, and the same connections are indicated with the exception that in the emitter circuit 2 of the transistor 1, the connection to the ground point 12 is made through a condenser 15 which has a capacitance of such a value as to provide a negligible impedance path for currents at signal frequencies while blocking the passage of direct current. Similarly, the collector electrode 8 of the transistor 6 is connected to ground through the condenser 16 which performs a like function. Alternative positions 15' and 16' for condensers 15 and 16 are indicated in Fig. 2 in dotted lines. This circuit performs a similar function to the circuit described above in blocking the passage of biasing current through the signal source. The output of transistor 1 is connected to the input of transistor 6 through another condenser 11 which also provides a negligible impedance path for signal currents and blocks the passage of direct current.

For the purpose of supplying proper operating or bias potentials, direct-current sources are provided to maintain the electrodes respectively positive and negative with reference to the base electrode, as provided in the disclosure of Bardeen-Brattain supra. These include the positive direct-current biasing circuit for the emitter electrode 2 of the transistor 1 which includes the direct-current source 17 connected in series with the resistance element 22 to the base electrode 5. The negative biasing circuit for the collector 3 of the transistor 1 includes the direct-current source 18 which is connected in series with the resistance element 23 to the base electrode 5.

In a similar manner, the emitter 7 and the collector 8 of the transistor 6 are respectively biased positively and negatively by the direct-current source 19 in series with the resistance element 24, and the direct-current source 20 in series with the resistance element 25.

For the purposes of discussion, the respective potentials of the biasing sources 17, 18, 19 and 20 will be designated $E_{e_1}$, $E_{c_1}$, $E_{e_2}$ and $E_{c_2}$, and the resistance values of the respective resistance elements 22, 23, 24 and 25 will be designated $R_{S_1}$, $R_1$, $R_2$ and $R_{L_1}$. In all instances the sources of potential, which may be conventional batteries, are connected between points across which an appreciable potential exists at signal frequencies during operation of the device as an amplifier. Accordingly, in Fig. 2, resistances 22, 23, 24 and 25 are provided in series with the respective potential sources 17, 18, 19 and 20 to provide passage for the direct current necessary to support proper bias potentials while at the same time offering relatively high resistance paths to currents at signal frequencies. More generally, any of these resistors could be replaced by a two-terminal network having such properties that it presents a closed path to the passage of direct current, preferably at relatively low impedance, while offering a high impedance to the passage of current at signal frequencies. To provide proper biasing voltages, account must be taken of the voltage drop in these blocking resistors or networks caused by the flow of bias current. Typical values will be discussed subsequently.

In amplifying devices employing transistors, one may encounter the question of stability, inasmuch as an improper choice of circuit values may cause the system to go into self-oscillation. The complete study of the stability of an amplifier which operates over a wide range of frequencies is complex, and cannot be entered into here. The methods outlined in the book, "Network Analysis and Feedback Amplifier Design," by H. W. Bode, D. Van Nostrand Co. 1945, are available for this purpose. It is characteristic of most devices employing transistors, however, that they will be stable provided the source and load circuits are of sufficiently high impedance. A sufficient condition for the stability of the simplified circuit of Fig. 3, for example, is that $R_S$ and $R_L$ be such that $$(R_S+R_{11})(R_L+R_{22})>R_{12}R_{21} \qquad (8)$$

where $R_{11}$ and $R_{22}$ are, respectively, the internal self-impedances of the input and output meshes of the amplifier, and $R_{21}$ and $R_{12}$ are the forward and reverse transimpedances from between the input and output meshes as discussed previously with reference to Figs. 1A–1C. It is apparent that $R_{11}$, $R_{22}$, $R_{12}$ and $R_{21}$ are constants which depend upon the particular transistor units used and the operating conditions chosen for them. Typical values of these constants might be as follows: $R_{11}=40$ ohms, $R_{22}=2500$ ohms, $R_{12}=160$ ohms, and $R_{21}=4500$ ohms. With these values, $R_S=600$ ohms and $R_L=2500$ ohms would be suitable to guarantee over-all stability of the device.

Returning to the physical device as exhibited in Fig. 2, certain further conditions are imposed because of the additional current paths introduced by the bias circuits. In the first place, as has already been mentioned, these current paths are in shunt with certain of the desired signal paths indicated in Fig. 3. The loss of signal current in these shunt paths can be made small by making these paths of sufficiently high impedance. Typical values to render these losses small might be as follows:

$$R_{S_1} \geqq 1000 \text{ ohms}$$
$$R_1 \geqq 50{,}000 \text{ ohms}$$
$$R_2 \geqq 1000 \text{ ohms}$$
$$R_{L_1} \geqq 50{,}000 \text{ ohms}$$

In addition to these loss considerations, the stability characteristics of the system again come into question. $R_{S_1}$ is effectively in parallel with $R_S$ at signal frequencies and $R_{L_1}$ in parallel with $R_L$. The relation (8) above for $R_S$ and $R_L$ must then be modified by replacing these quantities respectively by $$\frac{R_S R_{S_1}}{R_S + R_{S_1}}, \frac{R_L R_{L_1}}{R_L + R_{L_1}}$$

In addition, the $R_{11}$, $R_{22}$, $R_{12}$ and $R_{21}$ of that relation now depend not only on the transistor characteristics but also upon the values chosen for $R_1$ and $R_2$. This dependence is easily computed, but yields a formula too complex to have any illustrative value. With the values suggested above for $R_1$ and $R_2$, in typical narrow band systems, the influence of these resistors can be neglected. In wide band systems the analytic methods described in the book of H. W. Bode cited above, may be of assistance in considering questions relating to stability.

Figure 5:
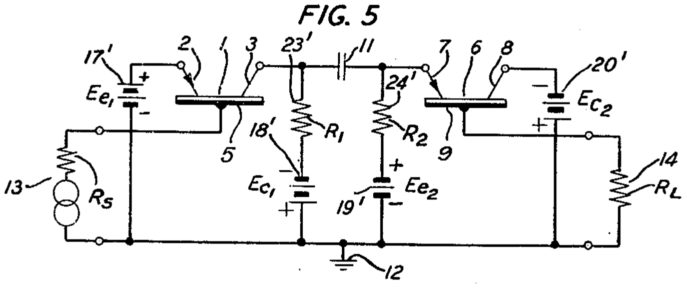
Fig. 5 is the circuit schematic of a modified embodiment of Fig. 2 showing an alternative arrangement of the biasing circuit.

The circuit of Fig. 5, in which the transistors and their respective electrodes, the signal source and the load are connected in the same manner as corresponding units in Fig. 2, and bear the same designations, shows a second possible form of the device differing from that in Fig. 2 in the arrangement of the bias circuits. In Fig. 5, the emitter 2 of the transistor 1, and the collector 8 of the transistor 6 are biased by the respective direct-current sources 17′ and 20′, which are connected directly to ground. The collector 3 of the transistor 1 is biased by a circuit which includes the biasing resistor 23′, and the direct-current source 18′, connected directly to ground; and the emitter 7 of the transistor 6 is biased by a similar circuit which includes the biasing resistor 24′ and the direct-current source 19′. This arrangement may have certain advantages in that all bias sources now appear at ground potential. For the purposes of discussion, assume that the potentials of the direct-current sources 17′, 18′, 19′ and 20′ are respectively designated as $E_{e_1}$, $E_{c_1}$, $E_{e_2}$ and $E_{c_2}$, and that the values of resistance elements 23′ and 24′ are designated as $R_1$ and $R_2$.

In Fig. 5 the bias circuits are somewhat interlocked, but the necessary biasing source voltages can be calculated readily from the following direct-current relations:

Let $V_e$=desired emitter voltage above base
$V_c$=desired collector voltage below base
$I_e$=resulting emitter current
$I_c$=resulting collector current with additional subscripts 1 and 2 to designate the corresponding transistor. Then with the sign conventions of the battery voltages $E_{e_1}$, $E_{c_2}$, etc., as shown on the diagram $$E_{e_1}=(I_{e_1}-I_{c_1})R_S+V_{e_1} \quad (9)$$

$$E_{c_1}=(I_{e_1}-I_{c_1})R_S+I_{c_1}R_1+V_{c_1} \quad (10)$$

$$E_{e_2}=(I_{e_2}-I_{c_2})R_L+I_{e_2}R_2+V_{e_2} \quad (11)$$

$$E_{c_2}=(I_{e_2}-I_{c_2})R_L+V_{c_2} \quad (12)$$

Typical values of the bias potentials and currents are $V_e$=+1 volt, $I_e$=+.5 ma., $V_c$=+30 volts, $I_c$=3 ma. The dependence of the stability of the system upon $R_1$ and $R_2$ is now more critical. A choice of $R_1 \geqq 100,000$ ohms and $R_2 \geqq 100,000$ ohms will, however, render their influence negligible, in typical narrow band systems.

Figure 6:
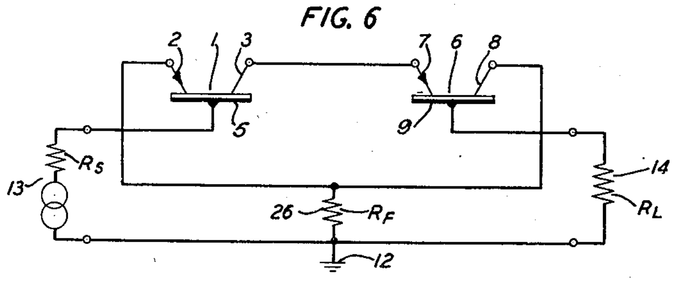
Fig. 6 shows a modified arrangement of the signal circuit of Fig. 3 for neutralization of positive feedback.

In accordance with one of the features of the invention, as described hereinbefore, the amplified signal current appearing in the load 14 is opposite in phase to the signal voltage appearing across the source generator 13. This feature provides a relatively simple means of neutralizing or eliminating the feedback which leads to the instability of the circuit discussed above. The schematic diagram of Fig. 6 shows how this can be done. In this figure the emitter 2 of the transistor 1 and the collector 8 of the transistor 6 are connected to a common point which is separated from the ground point 12 by a resistor 26 having a value $R_F$. It will be noted that the resistance $R_F$ has been introduced as an impedance common to meshes which carry both source and load currents. Because of the aforementioned phase-reversing property of the device, the signal current in $R_F$ introduces a voltage in the source mesh effectively in series with the source generator, which is opposite in phase to that introduced by the source generator. Therefore $R_F$ produces negative feedback. A choice of $R_F=R_{12}$, where $R_{12}$ is the circuit transimpedance in a reverse direction referred to in the relation (8) hereinbefore, is such as to make this negative feedback exactly cancel the intrinsic positive feedback of the device. This cancellation renders the system stable independently of the choice of $R_S$ and $R_L$. As mentioned above, a typical value might be $R_F$=160 ohms. An increase of $R_F$ beyond the value $R_{12}$ introduces further negative feedback which may be desirable in some applications. More generally, and in wide band systems, the resistor $R_F$ would be replaced by a two-terminal network whose characteristic would be one of the parameters used in designing the system to achieve the desired stability and transmission characteristics.

The schematic of Fig. 6 may be completed to includes the bias sources in either of the ways indicated in Figs. 2 and 5. A simple modification of the direct-current bias relations stated for Fig. 5 is required to account for the voltage drop in $R_F$.

Consider now, the characteristics of the second stage of the tandem combination of Fig. 3 operated as an amplifier, independently of the first stage, a signal source connected in series with the emitter electrode, and the load connected in series with the base electrode.

Figure 7:
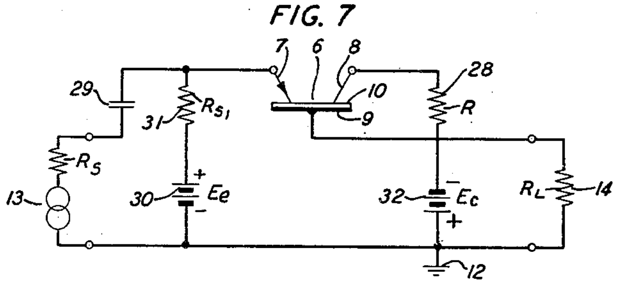
Fig. 7 shows a subcombination including only the second stage of the tandem amplifier circuit of Fig. 5 connected for independent operation.
Figure 8:
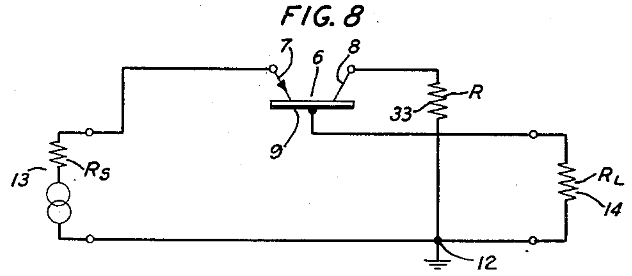
Fig. 8 is a simplified schematic including only the signal circuit of the amplifier of Fig. 7.

Fig. 7 shows an amplifying device comprising the aforesaid combination which includes a transistor 6, a source 13 of signal voltage, a load 14 and associated circuits. The transistor 6 is the same as the transistor 6 described hereinbefore with reference to Figs. 2 through 6, and comprises an emitter electrode 7, a collector electrode 8 and a base electrode 9 all in contact with a semiconducting block 10. Fig. 8 shows the essential components of Fig. 7, without the auxiliary circuits required to supply operating voltages to the transistor. In Fig. 8, the collector electrode 8 of the transistor 6 is connected to the common or ground point 12 through a network 33 shown simply as a resistor R. The source 13, shown as a generator with self-impedance $R_S$, is connected between ground 12 and the emitter electrode 7. The load 14, shown as a resistor $R_L$, connects between the base electrode 9 and ground 12. These are the paths for signal currents.

Figure 9:
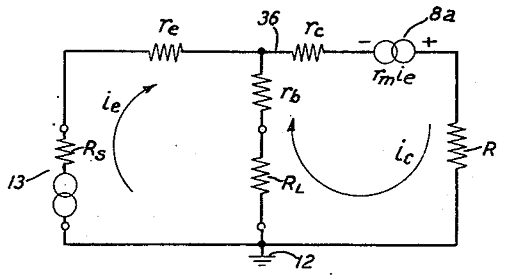
Fig. 9 shows an equivalent circuit of Fig. 8 for theoretical discussion.

Fig. 9 shows an equivalent circuit at signal frequencies for the amplifying device of Figs. 7 and 8.

As shown with respect to the second stage of Fig. 4, when $\alpha$, the current gain, is sufficiently large, the impedance measured between the input terminals to the equivalent circuit of Fig. 9—that is, the impedance into which the source 13 works—is negative, since a positive applied current $i_e$ produces a negative potential at its point of application, a condition which ordinarily obtains with typical circuit values.

The existence of a negative impedance at the input of the device places a restriction on the value of $R_S$ in order that the system be stable. It is evident that if $R_S$ were a positive impedance of such a value as exactly to cancel the negative input impedance across which it is connected, the mesh in which $i_e$ flows would have zero net impedance and would therefore oscillate. As mentioned hereinbefore, for the full analysis of the stability of the system in wide band applications, methods may be employed such as those described in the book, "Network Analysis and Feedback Design," by H. W. Bode. In narrow band systems, it will suffice in general to choose $R_S$, $R_L$ and R to satisfy the following condition in order to insure stability:

$$(R_S+R+r_e+r_c-r_m)(R_L+R+r_c+r_b) \geqq (r_c+R)(r_c-r_m+R) \quad (13)$$

In this relation, $r_e$, $r_c$, $r_b$ and $r_m$ are the constants of the transistor as indicated in Fig. 9. Typical values of these constants might be $$r_e=200 \text{ ohms}$$
$$r_b=100 \text{ ohms}$$
$$r_c=5{,}000 \text{ ohms}$$
$$r_m=10{,}000 \text{ ohms}$$

With these values, and $R_S \geqq 10{,}000$ ohms, $R_L \geqq 0$, $R=0$, the device would be stable. Increasing the value of R introduces negative feedback, which may in itself be desirable in some applications, and at the same time relaxes the restrictions on $R_S$ and $R_L$ as imposed by the inequality set forth in Equation 13.

Returning now to Fig. 7, the current path from the source 13 to the emitter electrode 7 is completed through a condenser 29 which offers a low impedance path for currents at signal frequencies but blocks the passage of direct current. A potential source 30, which may be a battery having a potential $E_e$, is connected to the emitter 7 through a resistor 31 to supply direct-current bias. The resistor 31, having a resistance value which will be designated $R_{S_1}$, provides passage for the biasing current while presenting a high impedance to currents at signal frequencies. A potential source 32, which may be in the form of a battery having a potential $E_c$ connected in the lead of the collector electrode 8 provides bias voltage for that electrode.

In Fig. 7, the only additional conditions imposed by the presence of the bias circuits are:

(i) The resistor $R_{S_1}$ represents a shunt path in which signal current is lost. To reduce this loss, the impedance of $R_{S_1}$ to currents at signal frequencies should be kept high; a value $R_{S_1} \geqq 20{,}000$ ohms would be adequate in typical circuits.

(ii) Looking from the input terminals of the transistor, $R_{S_1}$ is effectively in parallel with $R_S$ at signal frequencies and the relation (13) above must therefore be modified by replacing $R_S$ by $$\frac{R_S R_{S_1}}{R_S+R_{S_1}}$$

More generally (in particular, in wide band applications), all of the resistors $R_S$, $R_{S_1}$, $R_L$ and R should preferably be replaced by two terminal networks whose impedance functions would be parameters under control of the designer. The design methods outlined in the book of H. W. Bode referred to above would then be applied to produce a system whose stability, feedback and transmission properties were suitable to the intended application. A detailed discussion of these design problems in the present specification would be superfluous.

To insure proper bias potentials in the circuit of Fig. 7, the following direct-current relations are recommended.

Let $V_e$=desired emitter voltage above base
$V_c$=desired collector voltage below base
$I_e$=resulting emitter current
$I_c$=resulting collector current Then with the sign conventions of the battery voltages $E_e$, $E_c$, shown on the diagram $$E_e=(I_e-I_c)R_L+I_eR_{S_1}+V_e \quad (14)$$
$$E_c=(I_e-I_c)R_L+I_cR+V_c \quad (15)$$

Typical values of the bias potentials and currents are:

$$V_e=+1 \text{ volt}$$
$$I_e=+.5 \text{ ma.}$$
$$V_c=+30 \text{ volts}$$
$$I_c=3 \text{ ma.}$$

It is apparent that the concepts of the present invention can be carried out in other embodiments than those specifically shown and described herein for the purposes of illustration.

What is claimed is:

1. In combination, a first semiconductor body, a second semiconductor body, each of said bodies having emitter, collector and base electrodes cooperatively associated therewith, means for connecting a source of signals between the base electrode of the first body and a point of reference potential, means for connecting the emitter electrode of the first body through an external signal transducing connection to said point of reference potential, means for coupling the collector electrode of the first body to the emitter electrode of the second body in signal transfer relation, means for connecting the collector electrode of said second body through an external signal transducing connection to said point of reference potential, and means for connecting a useful load between the base electrode of said second body and said point of reference potential.

2. In a circuit including a two-stage amplifier, each of said stages comprising in combination a transistor including an emitter electrode, a collector electrode, a base electrode, and a semiconductor body in contact with said electrodes, means for connecting a source of signals between the base electrode of a first one of said transistors and a point of reference potential, means for connecting a useful load circuit between the base electrode of the second of said transistors and said point of reference potential, the collector electrode of the first said transistor being coupled in signal transfer relation to the emitter electrode of the second said transistor, two sources of biasing current each having a negligible signal impedance to said point of reference potential, one of said sources connected between said point of reference potential and the emitter electrode of said first stage and the other of said sources connected between said point of reference potential and the collector electrode of said second stage, two additional sources of biasing current for respectively supplying biasing current to the collector electrode of said first transistor and the emitter electrode of said second transistor, and a pair of impedance elements, each of said last-named biasing sources connected between its respective electrode and said point of reference potential in series with one of said impedance elements.

3. A circuit in accordance with claim 2 in which the parallel combination of said impedance elements has a value substantially in excess of the input impedance of the transistor comprised in the second stage of said amplifier.

BROCKWAY McMILLAN.

References Cited in the file of this patent

UNITED STATES PATENTS

| Number | Name | Date |
|---|---|---|
| 1,846,043 | Terman | Feb. 23, 1932 |
| 2,067,048 | Gill et al. | Jan. 5, 1937 |
| 2,101,699 | Baesecke et al. | Dec. 7, 1937 |
| 2,431,333 | Labin | Nov. 25, 1947 |
| 2,476,323 | Rack | July 19, 1949 |
| 2,486,776 | Barney | Nov. 1, 1949 |
| 2,517,960 | Barney | Aug. 8, 1950 |
| 2,524,035 | Bardeen et al. | Oct. 3, 1950 |
| 2,533,001 | Eberhard | Dec. 5, 1950 |
| 2,541,322 | Barney | Feb. 13, 1951 |
| 2,569,347 | Shockley | Sept. 25, 1951 |
| 2,585,078 | Barney | Feb. 12, 1952 |

OTHER REFERENCES

"Radio Engineering," text by Terman, 3d ed., pp. 308–311, published 1947 by McGraw-Hill Book Co., New York. (Copy in Div. 69.)